United States Patent Office 3,136,328
Patented June 9, 1964

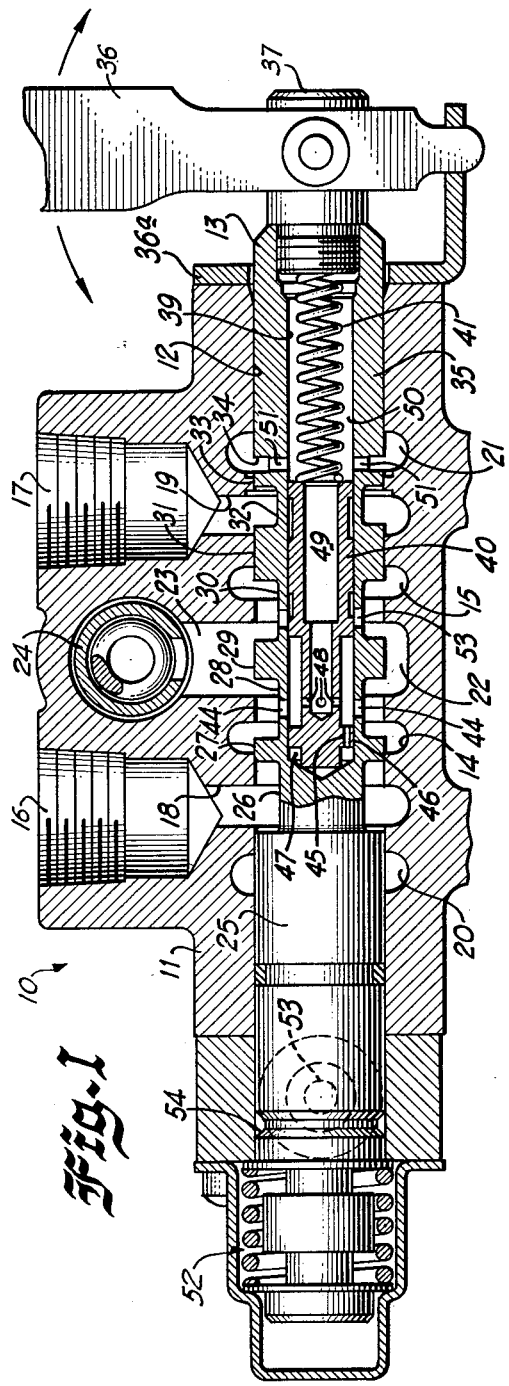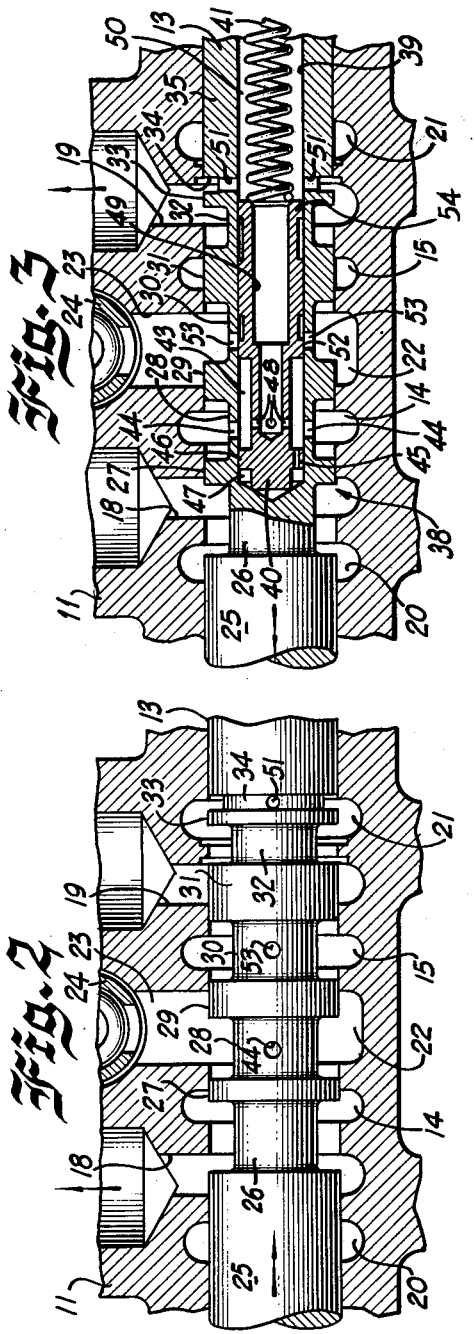
INVENTOR.
WILLIAM J. HIPP

3,136,328
SPOOL TYPE CONTROL VALVE WITH CONSTANT
FLOW VALVE IN SPOOL
William J. Hipp, Mount Pleasant, Wis., assignor to
Webster Electric Company, Racine, Wis., a corporation of Delaware
Filed Nov. 17, 1961, Ser. No. 153,174
6 Claims. (Cl. 137—117)

This invention relates generally to flow control valves of the type employing a valve spool mounted for sliding movement within a valve bore and is more particularly concerned with a valve of this type employing a valve spool movable through a control range to supply fluid to an outlet and having a flow divider mounted in the valve spool for the purpose of providing a pressure compensated, constant flow of predetermined value to the outlet irrespective of the position of the valve spool within the control range.

Prior to the present invention flow control valves have been designed utilizing a valve spool to supply a pressure compensated, controlled flow of fluid to an outlet but in these valves the flow level has varied with the position of the valve spool and, hence, the flow level remains constant only at a particular setting of the valve. In some hydraulic systems, it is important to provide a pressure compensated flow which remains constant despite movement of the valve spool. For example, the valve of the present invention has been used on oil delivery trucks where a pump driven by the engine of the vehicle supplies operating fluid for several motors, such as the motor or motors used in delivering oil from the vehicle tank to the customer and the motor or motors used to take up and pay out the hose between the vehicle and the customer's storage tank. In such systems it is desirable that the motor used in the oil delivery be supplied with the full pump output so that the oil can be delivered as rapidly as possible but the motor used to control the hose reeling should be supplied with a constant flow of fluid since delivery of large quantities of fluid to the latter motor by rapidly opening its control valve might result in whipping the hose to cause severe damage or injury to anyone near it. On the other hand, the fluid flow to the hose controlling motor should be sufficient to permit the hose to be extended or retracted within a reasonable time and at a safe rate. Since the hose reeling and the oil delivery are never carried out at the same time it is desirable that a single manually operated valve be used to control the flow to both the hose reeling motor and to the oil delivery motor. This valve must be capable of movement from a neutral position where neither motor is operated through a first range where the oil delivery motor receives the full output of the pump while the hose reeling motor is not operated and through a second range where the oil delivery motor is not operated but the hose reeling motor receives a pressure compensated, constant flow which remains at a predetermined level even though the valve may be thrown to the full open position. One of the objects of the present invention is to provide a flow control valve which satisfies the requirements described above.

While the above description has been devoted to the use of the valve of the present invention to solve a particular problem it should, of course, be understood that the invention is not limited to the described environment but will instead be useful in any arrangement wherein it is desirable to provide a predetermined flow to an outlet which flow remains constant despite movement of the valve. A primary object of the invention is, therefore, to provide a directional flow control valve utilizing a valve spool shiftable within a control range to supply a pressure compensated, predetermined constant flow to an outlet with the flow remaining constant even though the valve spool is shifted within said range.

A further object of the present invention is to provide a directional flow control valve utilizing a valve spool shiftable from a neutral position in either direction and so constructed and arranged that when the spool is shifted in one direction full pump flow is supplied to a first motor outlet while shifting of the valve in the opposite direction results in a pressure compensated reduced flow of predetermined, constant value to the opposite motor port.

Another object of the invention is to provide a valve of the character described above which is compactly arranged and simply constructed and is, therefore, relatively inexpensive to manufacture.

The invention has for a further object the provision of a directional flow control valve of the character described above having a flow divider valve mounted for sliding movement within an axial bore formed in the valve spool, the arrangement being such that a predetermined constant flow passes through the flow divider valve to the motor outlet and any excess above this predetermined flow is automatically bypassed at a pressure only slightly above that of the fluid delivered to the motor outlet with the result that the latter pressure may be considerably below the relief pressure of the system, thereby economizing on the power used and also minimizing heat losses.

The foregoing and other objects are realized, in accordance with the present invention, by providing a manually operated flow control valve utilizing a valve spool mounted for sliding movement within a valve bore between a plurality of different positions. The flow control valve may be of the two-way, three-way or four-way type, but assuming that a three-way valve is used there will be an inlet, a pair of motor outlets and at least one exhaust communicating with the valve bore. If the valve is of the three-way type the valve spool is so constructed that when it is in the neutral position the fluid from the inlet passes around the spool to an exhaust port leading to the tank or reservoir for the system. When the valve is shifted from the neutral position in a first direction to a first operating position the flow from the inlet to the tank is interrupted and the fluid is directed to a first of the motor outlets so that the full pump flow is available to the latter outlet. At this time the second motor outlet is connected to the exhaust leading to the tank or sump. In accordance with the present invention when a valve spool is shifted from the neutral position in the opposite direction towards a second operating position the first motor outlet is connected to the exhaust and the inlet fluid is directed to a chamber formed in the valve spool which chamber contains a flow divider valve of conventional construction having pressure dropping orifice means therein through which the inlet fluid passes to the second motor outlet. The flow divider valve provides a constant flow of predetermined value to the latter motor outlet and functions to divert any excess flow above the predetermined value to the exhaust thus bypassing the excess fluid at a pressure only slightly higher than the pressure of the fluid delivered to the second motor outlet and considerably below the system relief pressure. Thus, the flow to the second outlet remains at the predetermined level despite movement of the valve spool within the control range between the neutral position and the second operating position.

The invention both as to its organization and manner of operation together with further objects and advantages will best be understood by reference to the following detailed description taken in conjunction with the accompanying drawing wherein:

FIG. 1 is a fragmentary, sectional view illustrating a three-way valve characterized by the features of the present invention with the valve spool being shown in its neutral position;

FIG. 2 is a fragmentary sectional view showing the valve spool shifted from the neutral position to a first operating position to deliver the full output from the pump to a first of the motor outlets of the valve; and FIG. 3 is a fragmentary sectional view similar to FIG. 2 but shows the valve spool shifted from the neutral position in the opposite direction to a second operating position in order to deliver a pressure compensated, reduced flow of predetermined, constant value to a second motor outlet.

Referring now to the drawing, a valve generally indicated by the reference numeral 10 is there shown in the form of a three-way valve of the type employing a valve body 11 having an elongated valve bore 12 formed therein. A valve spool 13 is mounted for sliding movement within the bore from a neutral or off position shown in FIG. 1 to either of two operating positions respectively shown in FIGS. 2 and 3. While the valve is illustrated as a three-way valve it will become evident from the ensuing description that the features of the present invention may also be used with a conventional four-way valve or with a two-way valve having a single motor outlet. However the following description will be concerned with the use of the present invention in a three-way valve of the type shown in the drawing.

The valve 10 is supplied with inlet fluid from a suitable source such as a pump (not shown) having its outlet connected through suitable passages in the valve body (not shown) to a pair of spaced apart annular grooves 14 and 15 communicating with the valve bore 12. The annular grooves 14 and 15 are connected directly together by the passages in the valve body so that they are simultaneously and continuously supplied with inlet fluid from the pump.

The valve body 11 is also provided with a pair of motor outlets 16 and 17. If the valve is used on an oil delivery truck in the manner described above, the outlet 16 is connected to the oil delivery motor, while the outlet 17 is connected to the hose reeling motor. The motor outlets 16 and 17 are respectively connected to annular grooves extending around the valve bore 12. Exhaust passage means are also provided for receiving the return fluid flow from the motor outlets and for receiving the excess flow from the pump. In the form of the invention shown in the drawing, this exhaust passage means comprises a pair of annular grooves 20 and 21 connected together through a suitable passage (not shown) formed in the valve body 11. The exhaust passage means further comprises an exhaust chamber 22 extending around the valve bore 12 between the inlet grooves 14 and 15 and the latter chamber is connected through a passage 23 to the passage between the grooves 20 and 21 and also to an exhaust or bypass connection 24 leading to the tank or reservoir for the system.

To control the flow of fluid from the inlet grooves 14 and 15 to the motor outlets 16 and 17 and to control the return flow from the outlets to the exhaust passage means, the valve spool is provided with a plurality of spaced apart annular grooves and lands, these being identified from left to right as viewed in FIG. 1 by the reference numerals 25 to 35, inclusive. An operating handle 36 is connected to the valves spool 13 in any suitable manner as, for example, by means of diametrically opposed pins carried by a plug 37 having its end threaded into a tapped axial bore at one end of the spool. The handle 36 straddles the plug 37 and has its lower end mounted for pivotal movement upon an L-shaped bracket 36a secured to the valve body 11.

The valve handle 36 and the valve spool 13 are shown in FIG. 1 in the neutral or off position wherein the motor outlet 16 is blocked from the exhaust groove 20 by the land 25 and is also blocked from the inlet groove 14 by the land 27. Similarly, the motor outlet 17 is blocked from the inlet groove 15 by the land 31 and is also blocked from the exhaust passage groove 21 by the land 33. The inlet fluid supplied from the pump to the annular grooves 14 and 15 passes through the annular grooves 28 and 30 in the valve spool to the chamber 22 and then flows through the passage 23 to the tank connection 24 to provide an open center for bypassing the pump outlet directly to the tank in order to avoid build-up of pressure at the pump outlet.

The valve handle 36 may be pivoted upon the bracket 36a from the neutral position shown in FIG. 1 either in a clockwise direction to move the spool 13 to the position shown in FIG. 2 or in a counterclockwise direction to move the spool to the position shown in FIG. 3. A spring centering arrangement indicated generally by the reference numeral 52 is provided for exerting a force on the valve spool tending to return it to the neutral position from either of the operating positions. Since this spring centering arrangement is of conventional construction and forms no part of the present invention it will not be described in detail. Suitable sealing rings are also provided between the valve spool and the valve body to prevent leakage of fluid along the spool but since these are conventional they are neither described nor identified by reference numerals. A spring biased detent ball 53 cooperates with an annular groove 54 in the spool 13 to lock the spool in the first operating position shown in FIG. 2 but, here again, the detent mechanism is conventional and need not be described in detail.

When the handle 36 is turned in a counterclockwise direction from the position shown in FIG. 1, the spool 13 is moved within the bore 12 towards the right until the groove 54 reaches a position aligned with the ball 53 whereupon the ball is biased into the groove to hold the spool in position against the action of the spring centering arrangement 52 even though the handle is released. With the valve spool in this position, that is in the position shown in FIG. 2, the land 27 prevents the flow of inlet fluid from the annular groove 14 to the chamber 22 while the land 29 prevents flow from the inlet groove 15 to the chamber 22, thus breaking the open center path. Fluid delivered to the inlet groove 14 passes through the annular groove 26 in the valve spool to the outlet passage 18 and then to the motor outlet 16. The other motor outlet 17 is connected through the passage 19 and through the annular groove 32 in the valve spool to the exhaust groove 21 which, as was previously indicated, is connected to the tank or sump for the system. Thus, with the valve in the position shown in FIG. 2, the motor outlet 16 is connected to receive the full outlet flow from the pump while the motor outlet 17 is connected to the tank. When the valve 10 is used in the oil delivery system described above the full pump outlet is available for driving the oil delivery motor connected to the outlet 16 while the hose reeling motor connected to the outlet 17 is not operated. When it is desired to interrupt the flow to the outlet 16 as, for example, when the oil delivery to the customer has been completed, the handle 36 may be returned to the neutral position, thus moving the detent ball 53 out of the groove 54 and causing it to ride on the periphery of the spool. After the detent is disengaged the handle 36 may be released to permit the spring centering arrangement 52 to return the spool and the handle to the neutral position.

When the handle 36 is rotated from the neutral position in a clockwise direction as viewed in FIG. 1 to move the valve spool 13 to the position shown in FIG. 3, the land 31 blocks the inlet groove 15 to prevent the flow of inlet fluid from the latter groove. The motor outlet passage 18 is connected through the annular groove 26 of the valve spool to the exhaust passage groove 20 so that the motor connected to the outlet 16 cannot be operated. The other inlet groove 14 delivers inlet fluid to the annular groove 28 in the valve spool. The latter fluid cannot pass to the motor outlet passage 18 because it is blocked by the land 27 and it cannot flow to the chamber 22 because it is blocked by the land 29.

In accordance with the present invention, the inlet fluid delivered from the pump to the groove 28 passes through a flow divider valve indicated generally by the reference numeral 38 to provide a pressure compensated flow at a predetermined constant level to the motor outlet passage 19 and to divert all excess flow above this predetermined level to the exhaust chamber 22 for return to the tank or reservoir. The flow divider valve 38 is of conventional construction but, in accordance with an important feature of the present invention, it is mounted for movement within an axial bore or valve chamber 39 extending upwardly from one end of the valve spool 13. The outer end of the chamber 39 is closed by the plug 37 referred to above. The flow divider valve 38 comprises a piston 40 biased toward the blind end of the bore 39 by means of a spring 41 interposed between the plug 37 and the end of the piston. An annular groove formed in the periphery of the piston 40 cooperates with the valve spool 13 to form an inlet chamber 43 connected to the annular groove 28 through a plurality of radially extending ports 44. One or more passages 45 formed in an annular head 46 on the valve piston 40 connect the inlet chamber 43 to a dash pot chamber 47 formed between the blind end of the bore 39 and the piston head 46. Fluid entering the inlet chamber 43 passes through pressure dropping orifice means comprising a plurality of spaced apart, relatively small, radial orifices 48 formed in the valve piston 40 and leading from the inlet chamber 43 to an axial bore 49 formed in the valve piston. The latter bore opens at one end to a spring chamber 50 containing the compression spring 41. The spring chamber 50 is connected to the annular groove 34 in the valve spool through a plurality of spaced apart radial ports 51 defined in the valve spool 13. When the valve spool is in the position shown in FIG. 3, the groove 34 is exposed to the motor outlet passage 19 and to its associated annular groove in the valve body and, hence, fluid from the inlet groove 14 passes through the ports 44, through the inlet chamber 43 through the pressure dropping orifices 48 through the axial bore 49, through the spring chamber 50, through the radial ports 51, through the annular groove 34 and through the motor outlet passage 19 to the motor outlet 17. As was previously indicated, the flow divider valve 38 is adapted to maintain the flow to the motor outlet 17 at a constant, predetermined rate and, to this end, the spring 41 is selected to maintain the piston 40 seated against the blind end of the bore 39 until the pressure drop of the fluid flowing through the orifices 48 reduces the pressure in the bore 49 to a level where the greater pressure of the fluid in the dashpot chamber 47 acting against the lefthand side of the piston head 46 (as viewed in FIG. 3) becomes sufficient to overcome the reduced pressure in the bore 49 and the force of spring 41 in order to move the valve piston 40 toward the right until an annular land 52 thereon uncovers a plurality of radial ports 53 in the valve sleeve 13 to divert excess fluid from the inlet chamber 43 to the bypass chamber 22 leading to the tank connection 24. Thus, all of the fluid above the predetermined constant flow passing through the ports 51 is bypassed to the tank. It will be observed that the pressure of the fluid in the dashpot chamber 47 is substantially equal to that of the fluid in the inlet chamber 43 since there is very little flow through the passage 45. The head 46 and the passage 45 cooperate to form a dashpot for preventing oscillation of the valve piston 40 since the passage is small enough to prevent a rapid transfer of fluid between the chambers 43 and 47. If the pressure of the fluid tends to increase after the constant flow level to the outlet 17 is reached, the resulting flow through the orifices 48 causes an increased pressure drop across these orifices so that the pressure acting on the left side of the piston 40 moves the piston further to the right until a land 54 at its end restricts the ports 51 to reestablish the flow through the orifices 48 at the constant, predetermined level and, at the same time, to again bring about the constant pressure drop across these orifices. When the piston is moved to the right in response to increased pressure of the fluid delivered to the motor outlet 17, the excess fluid is bypassed through the ports 53, thus relieving the excess pressure. The hydraulic system may also be provided with a high pressure relief valve (not shown) for relieving excess pressure in either operating position of the valve, but the fluid bypassed through the ports 53 is at a pressure only slightly higher than that delivered to the outlet 17 and is considerably less than the relief pressure of the relief valve. Thus, fluid is bypassed at a relatively low pressure to economize upon power required from the prime mover driving the pump and also to reduce heat losses. In view of the foregoing description it will be recognized that with the valve spool in the position shown in FIG. 3, the flow divider valve 38 provides a constant flow to the motor outlet 17 and this flow is independent of the load on the motor and is also independent of variations in the pressure of the fluid delivered to the motor port. It will also be observed that the full amount of the predetermined constant flow is available to the motor outlet 17 almost immediately following movement of the valve piston 13 from the neutral position toward the position shown in FIG. 3. Thus, the flow is maintained at the predetermined constant level despite variations of the position of the valve piston 13 through the range from the neutral position to the full open position. While there may be a slight metering effect on the flow of fluid to the motor outlet 17 during the first very small increment of movement of the valve spool from the neutral position, this metering occurs only during about the first four percent of the spool movement and thus, for all practical purposes, the flow to the motor outlet 17 goes from the full off condition when the valve is in the neutral position to the constant flow condition as the valve spool is moved from the neutral position toward the right. Thus, when the valve is used in an oil delivery system of the type previously described, the spool may be moved to the full open position in supplying fluid to the hose reeling motor connected to the outlet 17 without delivering an inordinate amount of fluid to this motor, thereby avoiding the possibility of whipping the hose and, hence, eliminating the possibility of damage or injury. Moreover, almost immediately following movement of the spool from the neutral position, the predetermined flow is made available to the hose reeling motor so that the valve need not be fully open to attain the desired flow. The rate of flow of fluid to the motor outlet 17 is sufficient to drive the hose reeling motor at a safe speed without requiring a long time to complete the hose reeling operation.

While a particular embodiment of the invention has been illustrated and described, it should be recognized that many modifications will occur to those skilled in this art and it is therefore contemplated by the appended claims to cover all such modifications as fall within the true spirit and scope of the invention.

What is claimed as new and desired to be secured by Letters Patent of the United States is:

1. A flow control valve comprising:
   a valve body having a valve bore therein and also having an inlet, an outlet and exhaust means all communicating with said bore and spaced from each other longitudinally of the valve bore;
   a spool mounted for sliding movement within said bore from a first position to at least one operating position;
   means defining a valve chamber in said spool;
   first passage means in said spool connecting said valve chamber to said inlet when said spool is in said operating position;
   second passage means in said spool adapted for connecting said exhaust means to said chamber when the spool is in its operating position;
   a flow divider valve piston mounted for sliding movement within said chamber and including pressure dropping orifice means of predetermined size through which flows fluid delivered to the first passage means;
   means effective when the spool is in said operating position to connect said outlet to said chamber to receive fluid passing through said orifice means;
   means cooperating with said piston to maintain substantially constant the rate of fluid flow through the last mentioned means;
   and said flow divider valve piston including means cooperating with said second passage means to bypass to said exhaust means excess fluid above said constant rate flowing through said first passage means.

2. A flow control valve comprising:
   a valve body having a valve bore therein and also having an inlet, an outlet and exhaust means all communicating with said bore and spaced from each other longitudinally of the valve bore;
   a spool mounted for sliding movement within said bore from a first position to at least one operating position;
   means defining an axial bore extending inwardly from one end of said spool;
   first passage means in said spool connected to said axial bore at a point near one end thereof and effective to connect said axial bore to said inlet when said spool is in said operating position;
   second passage means in said spool adapted for connecting said exhaust means to said axial bore when the spool is in its operating position;
   a flow divider valve piston mounted for sliding movement within the axial bore in the spool and including pressure dropping orifice means of predetermined size through which flows fluid delivered to the first passage means from the inlet when the spool is in the operating position;
   means effective when the spool is in said operating position to connect said outlet to said axial bore to receive fluid passing through said orifice means;
   a spring acting on said piston to bias it towards said one end of said axial bore;
   means cooperating with said piston to move it within said axial bore against said spring in response to a predetermined pressure drop across said orifice means caused by fluid flow at a preselected rate;
   and said flow divider valve piston including means cooperating with said second passage means when said piston is moved against said spring to bypass to said exhaust means any excess fluid above said preselected rate flowing through said first passage means.

3. The apparatus defined by claim 2 wherein said piston is provided with a head portion having a passage therein and cooperating with said one end of said axial bore to form a dashpot for inhibiting oscillation of said valve piston.

4. A flow control valve comprising:
   a valve body having a valve bore therein and also having inlet means first and second outlets and exhaust means all communicating with said bore and spaced from each other longitudinally of the valve bore;
   a spool mounted for sliding movement within said bore from a neutral position to a first operating position wherein said first outlet is connected to said exhaust means and said spool also being movable to a second operating position wherein said second outlet is connected to said exhaust means and said first outlet is connected to said inlet means;
   means defining an axial bore extending inwardly from one end of said spool;
   first passage means in said spool connected to said axial bore at a point near one end thereof and effective to connect said axial bore to said inlet means when said spool is in said first operating position;
   second passage means in said spool adapted for connecting said exhaust means to said axial bore when the spool is in said first operating position;
   a flow divider valve piston mounted for sliding movement within the axial bore in the spool and including pressure dropping orifice means of predetermined size through which flows fluid delivered to the first passage means;
   means effective when the spool is in said first operating position to connect said second outlet to said axial bore to receive fluid passing through said orifice means;
   a spring acting on said piston to bias it towards said one end of said axial bore;
   means cooperating with said piston to move it within said axial bore against said spring in response to a pressure drop across said orifice means caused by fluid flow therethrough at a preselected rate;
   and said flow divider valve piston including means cooperating with said second passage means when said piston is moved against said spring to bypass to said exhaust means any excess fluid above said preselected rate flowing through said first passage means.

5. The apparatus defined by claim 4 wherein said piston is provided with a head portion having a passage therein and cooperating with said one end of said axial bore to form a dashpot for inhibiting oscillation of said valve piston.

6. A flow control valve comprising:
   a valve body having a valve bore therein and also having an inlet means, first and second outlets and exhaust means all communicating with said bore and spaced from each other longitudinally of the valve bore;
   a spool mounted for sliding movement within said bore from a neutral position to a first operating position wherein said first outlet is connected to said exhaust means and said spool also being movable to a second operating position wherein said second outlet is connected to said exhaust means and said first outlet is connected to said inlet means;
   means defining a valve chamber in said spool;
   first passage means in said spool connected to said chamber at a point near one end thereof and effective to connect said chamber to said inlet means when said spool is in said first operating position;
   second passage means in said spool adapted for connecting said exhaust means to said chamber when the spool is in said first operating position;
   a flow divider valve piston mounted for sliding movement within the axial bore in the spool and including pressure dropping orifice means of predetermined size through which flows fluid delivered to the first passage means;
   means effective when the spool is in said first operating position to connect said second outlet to said chamber to receive fluid passing through said orifice means;

a spring acting on said piston to bias it towards said one end of said chamber;

means cooperating with said piston to move it within said chamber against said spring in response to a pressure drop across said orifice means caused by fluid flow at a preselected rate;

and said flow divider valve piston including means cooperating with said second passage means when said piston is moved against said spring to bypass to said exhaust means any excess fluid above said preselected rate flowing through said first passage means.

References Cited in the file of this patent

UNITED STATES PATENTS

| | | |
|---|---|---|
| 2,737,196 | Eames | Mar. 6, 1956 |
| 2,910,085 | Banker | Oct. 27, 1959 |
| 2,946,347 | Ruhl | July 26, 1960 |
| 2,949,097 | Kaay | Aug. 16, 1960 |